Figure 1:
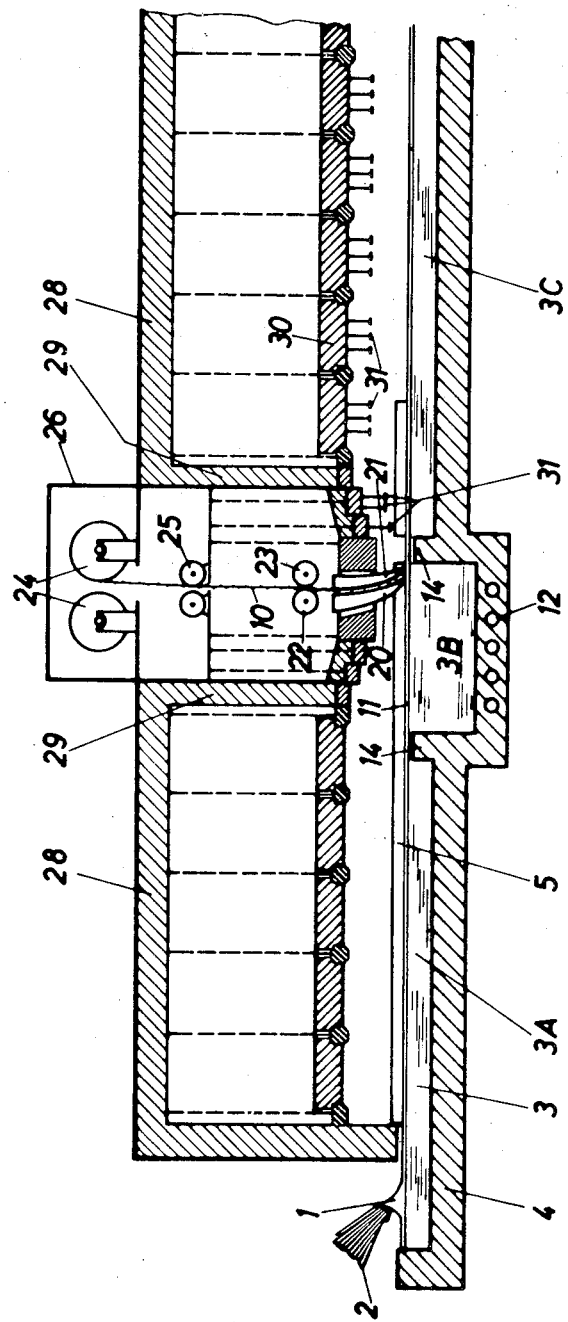

United States Patent [19]
Classen et al.

[11] 3,721,543
[45] March 20, 1973

[54] FLOAT GLASS APPARATUS WITH MEANS FOR INSERTING WIRE

[75] Inventors: Franz Classen, Porz-Grengel, Germany; Jean-Marc Parrot, Asnieres, France

[73] Assignee: Erste Deutsche Floatglas GmbH & Co. OHG, Porz, Germany

[22] Filed: June 9, 1969

[21] Appl. No.: 831,656

[30] Foreign Application Priority Data

June 14, 1968   Austria ............................. A 5727/68

[52] U.S. Cl. ................... 65/146, 65/99 A, 65/182 R
[51] Int. Cl. ....................... C03b 18/00, C03b 13/12
[58] Field of Search ............. 65/51, 99, 182, 146, 147

[56] References Cited

UNITED STATES PATENTS

| | | | |
|---|---|---|---|
| 3,207,591 | 9/1965 | Pfluger | 65/147 |
| 3,250,604 | 5/1966 | Toytot et al. | 65/182 X |
| 3,361,550 | 1/1968 | Murphy et al. | 65/147 X |
| 3,468,652 | 9/1969 | Beck | 65/182 X |
| 3,479,171 | 11/1969 | Robinson et al. | 65/182 X |
| 3,489,543 | 1/1970 | Kita et al. | 65/99 X |
| 3,558,294 | 1/1970 | Touvay | 65/51 |
| 3,582,302 | 6/1971 | Kita et al. | 65/51 |

*Primary Examiner*—Robert L. Lindsay, Jr.
*Attorney*—Irving M. Weiner

[57] ABSTRACT

A method and apparatus to make clear or transparent wire reinforced glass by the float process. Liquid glass, at a temperature of about 1050° C., is brought to its finished width on a molten tin bath. A wire inlay is introduced downwardly into the upper surface of the liquid glass by wire guiding means which do not contact the glass. The surface of the glass in contact with the metal bath is cooled to make the glass strip stiffer. This is done to prevent the forces which act on the glass during the introduction of the wire inlay from pressing it into the tin bath, and to aid in controlling the depth to which the wire inlay penetrates it. After the wire inlay is introduced into the glass, heat is applied to the upper surface of the glass to form an even plane surface.

2 Claims, 8 Drawing Figures

FLOAT GLASS APPARATUS WITH MEANS FOR INSERTING WIRE

The present invention relates to methods for the preparation of a strip or web of glass with a wire inlay, and more particularly to such methods in which liquid glass is poured in a regulated quantity on to a bath of molten metal, such as tin, on which the glass forms a layer of even thickness which flows along the tin and is cooled owing to temperature regulation.

This method of producing glass on a metal bath, known as the "float process", differs basically from known methods in which strips of glass with a wire inlay are produced. Owing to this basic difference it is not possible to apply known means and devices as used in conventional methods for manufacturing wire reinforced glass to the new method.

One object of the invention is to make use of the known advantages of the float process for the production of glass strips with a wire inlay.

A still further object of the invention is to modify the float method in such a manner that it makes possible continuous manufacture of a wire reinforced glass strip.

In accordance with one aspect the present invention consists of a method for making wire reinforced glass comprising the steps of placing glass on a tin bath, bringing the entire glass strip to a temperature of about 1050° C, introducing a wire inlay into the glass layer with the upper surface of the glass at about 1050° C from above while keeping the wire inlay introducing means clear of the surface of the glass, and applying such a quantity of heat to the glass strip after introduction of the wire inlay that cuts formed in the glass by the introduction of the wire are closed by a fusing of the upper surface of the glass strip.

It has been found that the temperature of the molten glass at the time of introduction of the glass inlay should not be below 1050° C. Below this temperature the viscosity of the glass is so high that introduction of the wire inlay into the central part of the glass thickness requires comparatively high forces. The exertion of such a pressing force on the glass band would displace the liquid tin at those areas where the force is applied. As a result the glass strip or web would yield in a vertical displacement and the proper introduction of the wire inlay into the glass would be impaired. If only a thin liquid layer is provided under the glass at those locations of vertical displacement, it is possible that the glass strip would be displaced far enough to come into contact with the solid bottom underneath the liquid thus damaging the lower surface of the glass.

These difficulties are avoided if the upper surface of the glass layer, at the time of introduction of the wire inlay, has a temperature not below 1050° C. At this temperature the glass still has a comparatively low viscosity and the glass strip has not yet stabilized. In the production of wire reinforced glass strip or web the breadth of the glass layer must not be allowed to undergo any changes because any such change would lead to an undesired relative movement between the wire inlay and the glass mass. It is therefore necessary to maintain the glass strip or web at a temperature of 1050° C while bringing it to its final width. For this purpose the sides of the glass strip or web are limited laterally by suitable limiting means between which the glass layer is passed until the glass strip has become sufficiently stabilized.

In accordance with a further feature of the invention the wire inlay is so introduced into the glass mass that the devices or means which guide and support the wire inlay do not come into contact with the surface of the glass. Any contact with the glass surface is found to damage it and must therefore be avoided.

In accordance with a preferred embodiment of the new inventive method the lateral limiting means which limit the width of the glass layer are made of a material such as graphite which can only be wetted by glass with difficulty.

In accordance with an advantageous feature of the invention the surfaces of the limiting means can be wetted with a layer of liquid tin, which is maintained on them to prevent contact with and wetting by the glass.

The method in accordance with a preferred embodiment of the present invention provides for cooling the lower surface of the glass strip, at least in the zone in which the glass strip has a temperature at its upper surface of 1050° C, so that a bottom or lower layer of glass is formed with an increased viscosity, the wire inlay being introduced from above into the glass layer. Owing to the increased viscosity of the colder lower layer the glass strip is made stiffer so that the pressing forces acting during the insertion of the wire inlay do not so readily press the glass into the tin bath, that is to say the glass offers a greater resistance to the bending force due to the introduction of the wire inlay. Furthermore the cooler bottom layer has the purpose of limiting penetration of the wire inlay when a certain depth is reached so that the wire inlay takes the desired position relative to the thickness of the glass layer. Thus the depth to which the wire inlay penetrates the glass is determined, inter alia, by the thickness of the cooler bottom layer, that is to say by the degree of cooling.

Finally the bottom layer which is subjected to a greater cooling action than the remainder of the glass, and therefore becomes stiffer imparts a greater strength to the glass strip or web as a whole so that the danger of distortion of the glass, for example of a thinning out of the glass under the action of tensile forces applied to the glass layer, is reduced.

The cooling of the glass layer is carried out on the liquid tin. For this purpose a zone in which the temperature of the tin can be regulated is conveniently formed extending transversely under the glass layer. For example the tin bath can be divided from below into several zones by means of partition walls extending as far as or nearly as far as the surface of the bath. It is, however, also possible to create zones of liquid tin with a lower temperature without dividing up the tin bath container at a position adjacent to the position of introduction of the wire inlay by providing for a relatively high removal of heat in these zones from the tin and, in certain circumstances, providing for transverse flow movements within the tin bath. It is also possible to reinforce transverse flow movements in the tin bath which even out the temperature of the tin.

At a position adjacent to the position at which the wire inlay is introduced into the glass, the surface temperature of the glass strip or web should not be below 1050° C, for the reasons which have already been given. On the other hand it may be possible to introduce the wire inlay at somewhat higher temperatures. However this increase in the temperature of the wire is limited, as described below, since at a comparatively high temperature undesired reactions between and the wire and the mass of glass may occur. The permissible maximum temperature substantially depends upon the type of wire material used and can easily be determined by tests.

Since the wire introducing means should not come into contact with the upper glass surface, the wire inlay is not supported during the last part of its travel on to the glass. The propelling of the wire into the glass surface in accordance with the invention means that the longitudinal wire parts of the wire inlay are subjected to a pressing and bending force. In order to give the wire inlay the necessary stiffness to resist these forces, the invention provides, in accordance with a further feature, that the wire inlay is cooled till shortly before its penetration into the glass surface.

Furthermore it is important that the wire inlay has a certain "lead" over the glass layer, that is to say it travels at the same speed or velocity as the glass but is slightly in front of it. If this were not so, tension forces would be applied to the wire inlay which might prevent satisfactory introduction of the wire inlay resulting in the wire inlay coming into position in the middle of the glass layer.

The depth to which the wire inlay penetrates the glass layer can be set not only by changing the degree of cooling of the bottom layer of the glass and by changing the degree of lead of the wire inlay in relation to the movement of the glass layer, but also by changing the angle at which the wire is introduced into the glass layer. A certain effect is also exerted by the distance of the wire introducing or guiding means from the glass layer, and the temperature of the wire at the instant it is introduced into the glass. The optimum conditions can readily be determined by tests.

A further embodiment of the method in accordance with the invention is characterized in that the glass strip or web, at a position of introduction of the wire inlay, is so deflected locally out of its transport plane, while being supported on the liquid tin, that the wire guiding or supplying means can be lowered in relation to the level of the glass strip from the highest point of this local deflection to below the upper surface of the glass strip without coming into contact with the glass surface, so that, consequently, the wire inlay is drawn by the pull of the glass strip into the glass layer.

In practice this arrangement can be so made, for example, that a coherent protective gas stream or current is blown on to the glass strip to bring about a partial local displacement of the liquid tin downwardly in a bay into which the glass supply or guiding means extend.

In accordance with a further practical possibility the glass strip is passed over a barrier or threshold which is immersed in the tin and extends clear of its surface so as to cause a local upward bending of the glass. The part or surface of the barrier extending above the tin bath is so porous that liquid tin can be pumped through it so as to form a film on the surface of the barrier over which the glass strip can slide.

In these forms of the new method in accordance with the invention it may also be advantageous to provide for a reinforced or relatively greater cooling rate of the lower surface of the glass strip at a position at which the glass strip is deflected out of a transport plane, thus leading to the above-described advantages. For this purpose the same method and means can be applied as has been described in accordance with the first embodiment of the invention.

After the introduction of the glass layer the surface of the glass strip or web necessarily has recesses or cuts which can be caused to disappear completely by supplying heat in carefully controlled quantities to the upper surface of the glass strip. In this heat treatment of the glass strip it may be advantageous to maintain a temperature gradient within the glass layer as is the case at the position at which the glass inlay is introduced, that is to say the bottom layer is maintained at a lower temperature.

The method in accordance with the invention is also particularly advantageous since the wire inlay is necessarily introduced in a completely oxygen free, reducing atmosphere. This avoids any danger of corrosion of the wire inlay and allows the use of relatively inexpensive wire inlays without chrome plating. Any iron oxide which may be present on the wire is reduced by the atmosphere over the tin bath so that the wire inlay has a satisfactory appearance.

Further advantages of the new method and of forms of apparatus for carrying it out will be gathered from the following description referring to the accompanying drawings.

Figure 2:
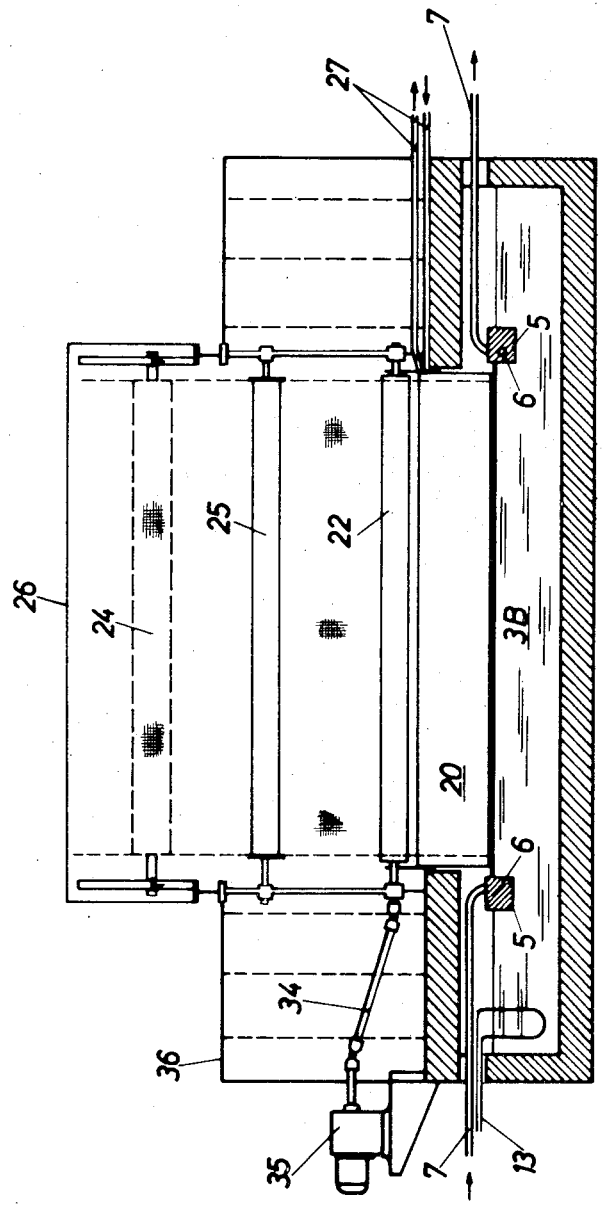
Figure 3:
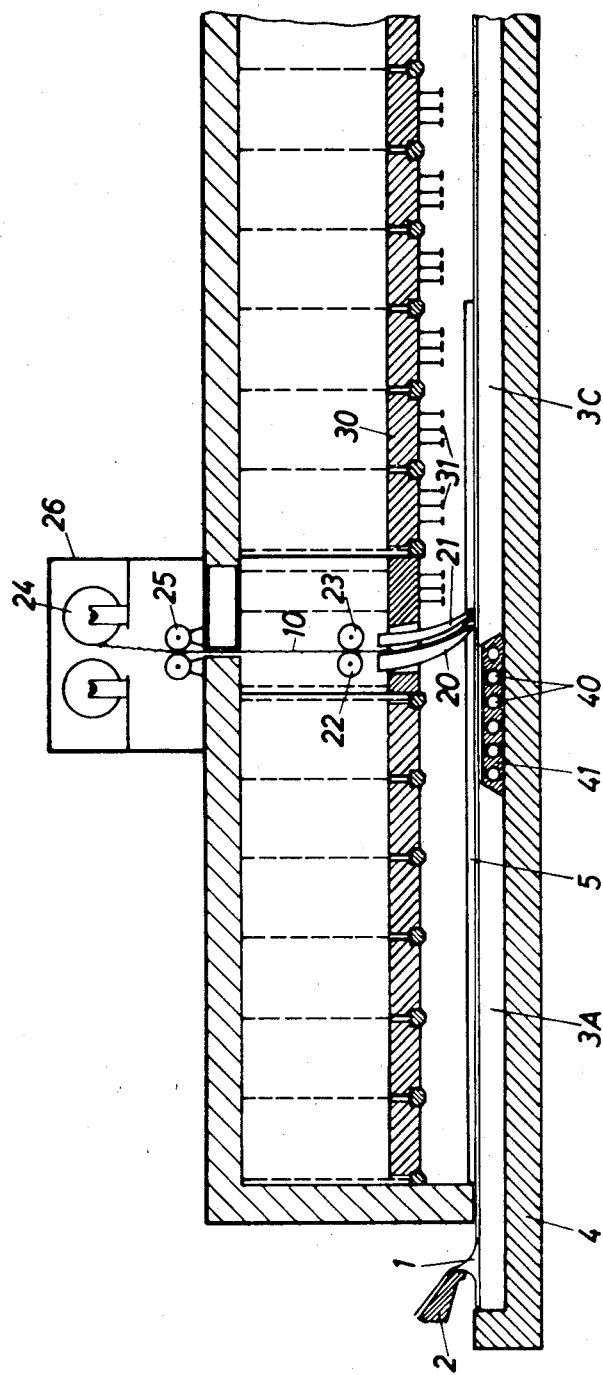
Figure 4:
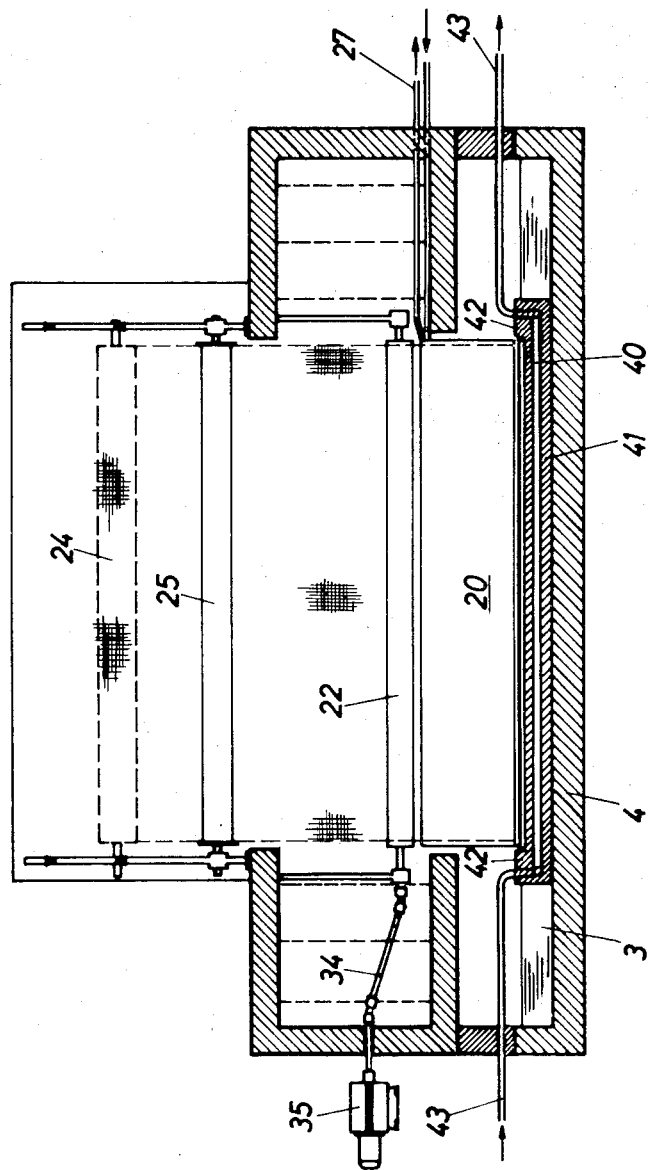
Figure 5:
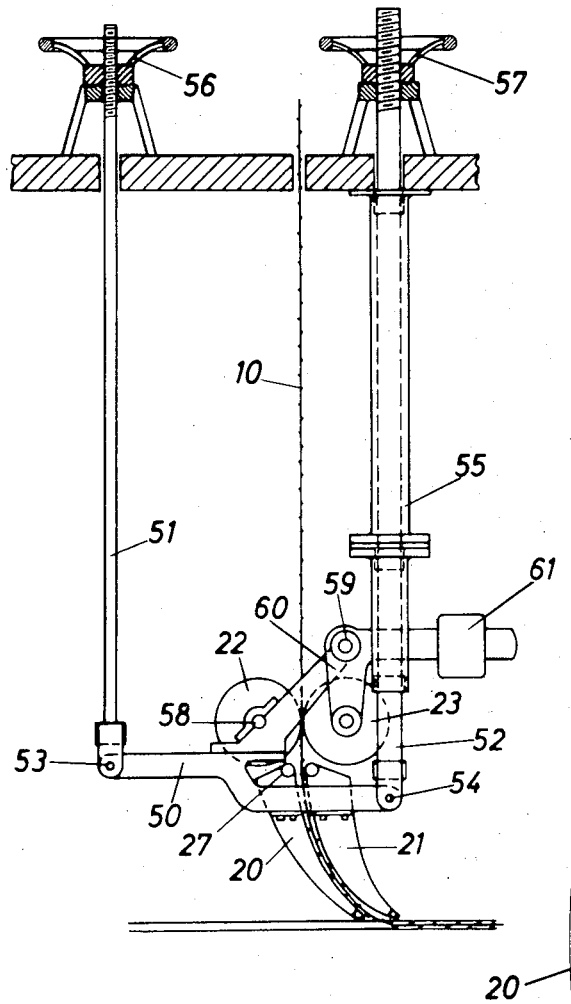
Figure 6:
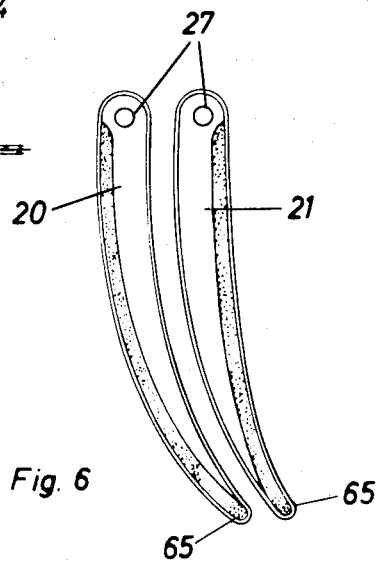
Figure 8:
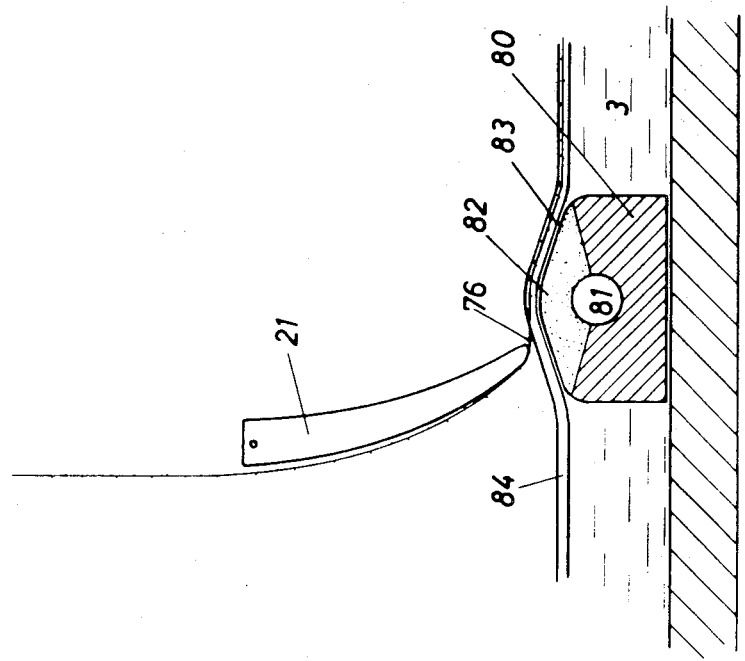
Figure 7:
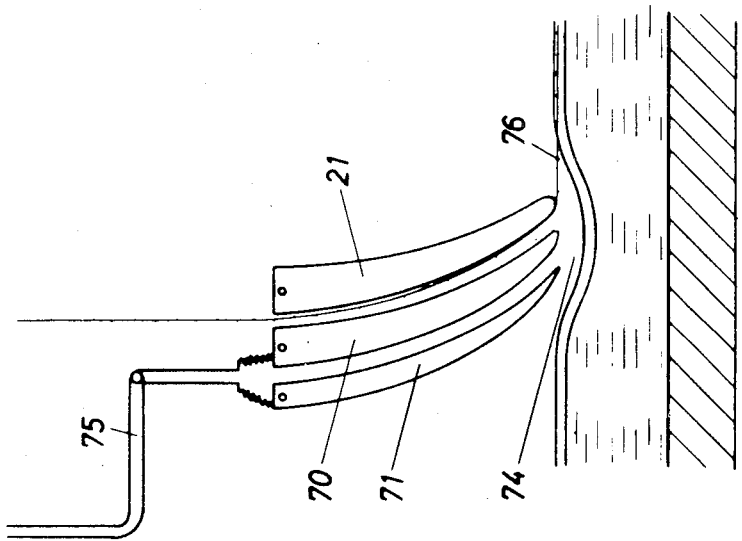

FIGS. 1 and 2 show a first embodiment of an installation for the production of wire reinforced float glass in longitudinal and transverse section, FIGS. 3 and 4 show a further embodiment of such an installation, in longitudinal cross-section, FIG. 5 shows an embodiment of a wire supplying or guiding means which allows the angle of introduction of the wire inlay to be adjusted, FIG. 6 is a detailed view of the guide body forming part of the wire introducing means, FIG. 7 shows an arrangement for forming a downwardly extending bay at the point at which the wire is introduced, FIG. 8 shows an arrangement for forming an upwardly directed curvature or vaulting adjacent to the point of introduction of the glass.

Referring now to the drawings, and more particularly to FIG. 1, it can be seen that, as is conventional in float glass plant, the liquid glass 1 is poured over a suitable spout 2 on to the molten tin bath 3. The tin bath is contained in an elongated tin bath container 4. In its upstream zone 3A the tin bath is at a comparatively high temperature so that the molten glass can readily spread out on it.

As is shown in FIGS. 1 and 2, in the zones 3A and 3B of the tin bath on both sides of the glass layer there are limiting bodies 5 which limit broadening or widening out of the glass. The limiting bodies 5, in the form of rows of blocks, are made of graphite and are provided with a central hole or opening 6 for the supply of coolant via supply duct 7 so that the temperature of the limiting bodies is held at a value at which the glass does not stick.

The limiting bodies 5 can be made of porous graphite and the coolant supplied through the central holes 6 can be a protective gas or liquid tin which passes through pores in the limiting bodies and emerges at the surface adjacent to the glass layer so as to form a film on the surface which favors movement of the glass layer along the limiting bodies.

The zone or part 3B of the tin bath, above which the wire inlay 10 is introduced into the glass layer 11, has a lower temperature than the zone 3A. In order to cool the tin in this zone, cooling tubes 12 are arranged in the bottom of the container. Furthermore, as can be seen in FIG. 2, cooling tubes 13 are arranged to the side beyond the limiting bodies 5 and the tin bath container is deeper in the zone 3B so that transverse currents which may favor an even cooling may be encouraged. Furthermore in order to separate the zone of the bath which is cooled to a greater extent from the adjacent zones on both sides of the zone 3B, barriers 14 are provided which extend to the or almost to the surface of the tin bath.

Above the bath zone 3B the wire supplying or guiding means is arranged. It comprises two guide bodies 20, 21 extending almost as far as the upper surface of the glass strip, for the purpose of guiding the wire inlay. Furthermore the means include a pair of rolls 22, 23 arranged above the guide bodies 20 and 21 to advance the wire inlay 10 from a supply roll 24. If required further guide rolls 25 can be provided on the path of the wire inlay from the supply roll to the feed rolls 22, 23. The latter may be provided with projections to extend into the mesh openings of the wire inlay net to ensure a satisfactory alignment of the weft wires. The guide bodies 20, 21 are provided with coolant via tubes 27.

In order to make the wire supplying or guiding means as accessible as possible, in the case of the embodiment shown in FIG. 1 the top part 28 of the tin container is interrupted, and owing to the presence of vertical walls 29 and the gas-tight metal housing 26 a space is defined in which the drive and guide mechanism is arranged so as to be outside of the atmosphere in the tin bath container.

Above the zone 3C of the tin bath electric heating elements 31 are arranged below the top 30 of the tin bath container. Their power can be adjusted so as to be adapted to conditions as may be required.

Feed rolls 22, 23 are driven by a drive motor 35 via a shaft 34, as shown in FIG. 2. A gas-tight housing 26, 36, within which the roll pairs are journaled, ensures that the upper surface of the tin bath does not come into contact with the oxygen of the external atmosphere.

In the embodiment of the invention shown in FIGS. 3 and 4 there is a cooling beam 41 provided with cooling tubes 40 within the tin bath. This cooling beam or barrier 41 lies below the level of the tin bath and ensures that the necessary cooling of the tin layer between the beam and the glass band takes place. Longitudinally to the sides of the beam are upward projections 42 which perform the function of limiting bodies. The tubes 43 deliver the liquid coolant to, and remove it from, the cooling beam. As is the case with the limiting bodies 5, the cooling beam 41 with its projections 42 can conveniently be made of graphite or another form of carbon.

The guide bodies 20 and 21 for guiding the wire inlay are conveniently arranged to be adjustable in generally vertical and angular directions. For this purpose, as is shown in FIG. 5, the arms 50, to which the guiding means 20 and 21 are attached, are pivoted on the bottom ends of two threaded rods 51, 52 at 53 and 54. The threaded rod 52 is guided by a fixed sleeve 55. With the help of the handwheels 56 and 57 the height position, or vertical position and inclination, or angular displacement of the guide bodies can be set as required.

The arms 50 also carry the advance rolls 22 and 23. While the roll 22 is journaled in fixed bearing, the roll 23 is arranged on the end of a pivoting lever 60 which is journaled at 59 for a swinging movement. At the other end of the swinging lever 60 there is a counterweight 61 for pressing the roll 23 against the roll 22 as is required for the feeding of the glass inlay.

The wire guide or supply bodies 20 and 21 are hollow and have coolant flowing through them. The coolant is supplied and removed by tubes 27 and serves inter alia for limiting the temperature of the wire inlay on its path into the glass mass so that it has the necessary degree of stiffness. As is shown in FIG. 6, the guide bodies can be provided with heat insulation 65 on their outer surfaces or at least at their bottom ends. This insulation can serve to prevent an excessively intense cooling of the glass strip surface by the guide bodies which are comparatively close to the surface of the glass.

The apparatus described can be used not only for inserting an inlay in the form of a net of wires, but also, with a few modifications, for the insertion of such an inlay consisting only of parallel wires. For the introduction of such an inlay the two guide rolls 20 and 21 are replaced by a suitable number of double-walled guide tubes which support each wire individually upstream from the point of its introduction into the glass.

The arrangement shown in FIG. 7 not only has the wire supply or guide means 21 proper, but also similar parts 70 and 71 which form a nozzle slot for blowing protective gas on to the glass strip to form a downwardly curving bay 74 in the glass strip. The protective gas must have a temperature which is sufficiently high to prevent cooling the glass surface below the permitted temperature limit. In order to ensure against excessive cooling protective gas can be drawn off above the tin bath and conveyed in a circuit via duct 75 through the nozzle slot. Independent of this, the wire inlay can be guided in the manner described through the cooled nozzle slot.

With the formation of the downwardly curving bay 74 it is possible to dispense with the requirement of pushing the wire inlay down into the glass layer, and instead the wire inlay is simply taken up by the glass.

The principle of causing the wire inlay to be taken up by the glass layer can also be put into practice using the arrangement shown in FIG. 8. In this arrangement there is a barrier 80 extending upwardly from below the tin bath 3 transversely over the whole width of the bath. The top of this barrier 80 is above the level of the tin bath. The barrier 80 is made of a highly refractory material, preferably graphite, which is provided with a central channel or hole 81. The upper part 82 of the barrier 80 is sufficiently porous to allow liquid tin to be pumped through it. The tin emerges from the pores, and thus forms a continuous tin film on the barrier or threshold. This tin film prevents a direct contact of the glass band 84 with the barrier 80. The wire supply or guiding means 21 only have the purpose of guiding the wire inlay, and not pushing it downwardly, since the wire inlay 76 is taken up by the glass strip. Since this is so, it is not necessary to form the glass guiding means in two parts to form a slot, but instead the arrangement made in one part, denoted as 21 in FIG. 8, is sufficient. Furthermore as was also the case with the construction shown in FIG. 7, the pair of guide rolls 22 and 23 as arranged in FIGS. 1 to 6 are not required.

It is to be understood that the embodiments described only present preferred and particularly advantageous forms of the invention and other forms are possible for putting the basic principle of the invention, as defined in the following claims into practice.

The embodiments of the invention in which an exclusive property or privilege is claimed are as follows:

1. An apparatus for producing a transparent flat glass strip, comprising in combination:
    a molten metal bath;
    means for delivering molten metal to said molten metal bath in controlled quantitites;
    means for advancing said glass along the length of said bath;
    means enclosing said bath;
    laterial limiting bodies extending longitudinally to said bath for limiting the spread of glass on said molten metal bath;
    said lateral limiting bodies are made of porous graphite;
    said lateral limiting bodies have holes disposed therethrough;
    an anti-wetting material capable of flowing through said holes and passing through said porous graphite of said lateral limiting bodies and emerging at a surface of said limiting bodies in contact with said glass to prevent said glass from wetting said limiting bodies;
    means for guiding a wire inlay into said glass;
    heating means arranged above said glass downstream from said guiding means to heat an upper surface of said glass to form a smooth plane surface thereon; and
    cooling tubes located under said wire inlay guiding means in a bottom portion of said means enclosing said bath for cooling said glass progressively from a bottom surface to a top surface of said glass to produce a stiffening of said bottom surface of said glass to aid in positioning said wire inlay within said glass.

2. An apparatus for producing a transparent flat glass strip, comprising, in combination:
    a molten metal bath;
    means for delivering molten metal to said molten metal bath in controlled quantities;
    means for advancing said glass along the length of said bath;
    means enclosing said bath;
    lateral limiting bodies extending longitudinally to said bath for limiting the spread of glass on said molten metal bath;
    said lateral limiting bodies are made of porous graphite;
    said lateral limiting bodies have holes disposed therethrough;
    an anti-wetting material capable of flowing through said holes and passing through said porous graphite of said lateral limiting bodies and emerging at a surface of said limiting bodies in contact with said glass to prevent said glass from wetting said limiting bodies;
    means for guiding a wire inlay into said glass;
    heating means arranged above said glass downstream from said guiding means to heat an upper surface of said glass to form a smooth plane surface thereon;
    a cooling beam located below said wire inlay guiding means in said molten metal bath extending across the width of said bath in a direction transverse to the direction of the advancement of said glass, said beam being completely immersed in said bath; and
    cooling tubes located in said beam for cooling said glass progressively from a bottom surface to a top surface of said glass to produce a stiffening of said bottom surface of said glass to aid in positioning said wire inlay within said glass.

* * * * *